US009503505B2

(12) United States Patent
Beckman et al.

(10) Patent No.: US 9,503,505 B2
(45) Date of Patent: *Nov. 22, 2016

(54) MONADIC EVALUATION OF INJECTED QUERY COMPOSITIONS

(71) Applicant: Microsoft Technology Licensing, LLC, Redmond, WA (US)

(72) Inventors: Brian Beckman, Newcastle, WA (US); Elad Gerson, Seattle, WA (US); Gur Kimchi, Seattle, WA (US); Avi Bar-Zeev, Redmond, WA (US); Selvi Chennai, Sammamish, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,780

(22) Filed: Jun. 25, 2015

(65) Prior Publication Data

US 2015/0295990 A1 Oct. 15, 2015

Related U.S. Application Data

(63) Continuation of application No. 13/279,245, filed on Oct. 21, 2011, now Pat. No. 9,075,672.

(51) Int. Cl.
*G06F 17/30* (2006.01)
*H04L 29/08* (2006.01)
(Continued)

(52) U.S. Cl.
CPC ............ *H04L 67/02* (2013.01); *G06F 9/4428* (2013.01); *G06F 9/547* (2013.01); *G06F 17/30498* (2013.01); *G06F 17/30513* (2013.01); *H04L 67/42* (2013.01)

(58) Field of Classification Search
CPC .................. G06F 17/30498; G06F 17/30513; H04L 67/02
USPC .......................... 707/769, 713, 781, 783, 770
See application file for complete search history.

(56) References Cited

U.S. PATENT DOCUMENTS 7,730,079 B2 6/2010 Meijer et al.
7,774,361 B1 8/2010 Nachenberg et al.
(Continued)

FOREIGN PATENT DOCUMENTS

CN 1989486 A 6/2007
CN 101312457 A 11/2008
(Continued)

OTHER PUBLICATIONS

Schreiber, et al., "Thirteen New Players in the Team: A Ferrybased LINQ to SQL Provider", Retrieved at <<http://www.pathfinder-xquery.org/files/publications/thirteen-new-players.pdf>>, Proceedings of the VLDB Endowment, vol. 3, No. 2, Sep. 2009, pp. 4.
(Continued)

*Primary Examiner* — Vincent Boccio
(74) *Attorney, Agent, or Firm* — Steven Spellman; Tom Wong; Micky Minhas (57) ABSTRACT

Embodiments enable the evaluation of injected queries within a monad. One or more operators with closures are received from a first process. The operators with closures represent one or more functions to be applied by a second process. The second process evaluates the received operators with closures to apply the functions within the monad. During evaluation, the second process converts the closures to simply typed closures. Further, the second process binds the converted closures within the monad to restrict execution of the functions. In some embodiments, the queries (e.g., sequences of one or more operators with closures) are composed using a set of query operators from the language integrated query (LINQ) framework encoded in uniform resource locators (URLs) in the representational state transfer (REST) style.

19 Claims, 5 Drawing Sheets

(51) Int. Cl.
*G06F 9/54* (2006.01)
*G06F 9/44* (2006.01)
*H04L 29/06* (2006.01)

(56) References Cited

U.S. PATENT DOCUMENTS

| | | | |
|---|---|---|---|
| 8,806,451 | B2 | 8/2014 | Zheng et al. |
| 9,317,255 | B2 | 4/2016 | Meijer et al. |
| 2003/0167261 | A1 | 9/2003 | Grust et al. |
| 2007/0050347 | A1 | 3/2007 | Johannes Maria Meijer et al. |
| 2009/0144229 | A1 | 6/2009 | Meijer et al. |
| 2010/0114885 | A1 | 5/2010 | Bowers et al. |
| 2010/0333201 | A1 | 12/2010 | Haviv et al. |
| 2011/0173621 | A1 | 7/2011 | Meijer et al. |
| 2012/0072442 | A1 | 3/2012 | De Smet et al. |
| 2012/0117644 | A1 | 5/2012 | Soeder |
| 2012/0284237 | A1 | 11/2012 | Li et al. |

FOREIGN PATENT DOCUMENTS

| | | |
|---|---|---|
| CN | 101315600 A | 12/2008 |
| CN | 102200911 A | 9/2011 |

OTHER PUBLICATIONS

Kozel, et al., "Mobile Access into Information Systems", Retrieved at <<http://ieeexplore.ieee.org/stamp/stamp.jsp?tp=&arnumber=4588522>>, 30th International Conference on Information Technology Interfaces, Jun. 23-26, 2008, pp. 851-856.

Gerner, et al., "Automatic ClientServer Partitioning of DataDriven Web Applications", Retrieved at <<http://www.cs.cornell.edu/~yangf/152.pdf>>, Proceedings of the ACM SIGMOD international conference on Management of data, Jun. 27-29, 2006, pp. 4.

"Walkthrough: Creating an IQueryable LINQ Provider", Retrieved at <<http://msdn.microsoft.com/en-us/library/bb546158.aspx>>, Retrieved Date: Aug. 25, 2011, pp. 15.

"Effective Stored JavaScript in MongoDB", Retrieved at <<http://vasilrem.com/blog/software-development/stored-javascript-in-mongo/>>, Retrieved Date: Aug. 25, 2011, pp. 5.

"The WebSockets Prototype Gets Another Update", Retrieved at <<http://7388.info/index.php/article/wpf/2011-03-03/9209.html>>, Retrieved Date: Aug. 25, 2011, pp. 6.

"Enunnerable Methods", Retrieved at <<http://msdn.microsoft.com/en-us/library/bb341635(d=printer).aspx>>, Retrieved Date: Sep. 14, 2011, pp. 17.

United States Patent and Trademark Office, Non Final Office Action issued on Apr. 10, 2014 in related U.S. Appl. No. 13/279,245, Apr. 10, 2014, United States.

United States Patent and Trademark Office, Notice of Allowance issued on Dec. 5, 2014 in related U.S. Appl. No. 13/279,245, Dec. 5, 2014, United States.

United States Patent and Trademark Office, Notice of Allowance issued on Mar. 13, 2015 in related U.S. Appl. No. 13/279,245, Mar. 13, 2015, United States.

State Intellectual Property Office of the P.R.C., First Office Action and Search Report issued on Jun. 3, 2014 in related Chinese Patent Application No. 201210405280.5, Jun. 3, 2014, China.

State Intellectual Property Office of the P.R.C., Notice of Allowance issued on Dec. 22, 2014 in related Chinese Patent Application No. 201210405280.5, Dec. 22, 2014, China.

State Intellectual Property Office of the P.R.C., Reply to Office Action filed on Oct. 18, 2014 in related Chinese Patent Application No. 201210405280.5, Oct. 18, 2014, China.

Grust, "Monad Comprehensions: A Versatile Representation for Queries", The Functional Approach to Data Management—Modeling, Analyzing and Integrating Heterogeneous Data, Sep. 2003, pp. 288-311, Springer.

Dyer, "The Marvels of Monads", Retrieved from <<https://blogs.msdn.microsoft.com/wesdyer/2008/01/10/the-marvels-of-monads/>>, Jan. 10, 2008.

MONADIC EVALUATION OF INJECTED QUERY COMPOSITIONS

BACKGROUND

Data exchange among computers can take the form of client-server communications, peer-to-peer communications, process-to-process communications, and the like. Some existing systems attempt to anticipate data queries to be received by one device from another device by pre-programming those data queries. Such systems, however, require significant resources and cannot anticipate every possible data query. Other existing systems allow devices to create imperative queries such as in the JAVASCRIPT scripting language. With these systems, however, queries are difficult to compose, serialize, and parse because of their length and syntactic complexity. Further, imperative queries expose security vulnerabilities at least because they contemplate the execution of code from untrusted sources (e.g., the performance of unrestricted allocation and copying). As such, these existing systems fail to prevent or contain the execution of malicious queries injected into communications sent over transport protocols such as the hypertext transfer protocol (HTTP).

SUMMARY

Embodiments of the disclosure enable bi-directional, dynamically programmable injection of operations into communications between a first process and a second process. A sequence of one or more operators with closures is received from a first process by a second process. The closures represent one or more functions to be applied within a monad by the second process. The second process evaluates the received operators with closures to execute the functions. During evaluation, the closures are converted to simply typed closures. Further, evaluation of the operators with converted closures is bound within a monad to restrict execution of the functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable monadic evaluation of dynamically programmable, composable, non-imperative queries. In some embodiments, declarative closures using a set of query operators are implemented in a scripting language for bi-directional query injection in web applications and mobile applications.

While some examples herein are discussed with reference to lambda expressions, aspects of the disclosure are not limited to lambda expressions but instead operable with any form of closures or other closed expressions. For example, embodiments are operable with anonymous inner classes.

Aspects of the disclosure include a set of query operators that enable composable queries over enumerable data collections (e.g., whose elements are available in memory at a given time) or asynchronous data collections (e.g., whose elements arrive at different times). Enumerables represent data distributed over a space domain whereas observables represent data distributed over a time domain. As an example, enumerables may span a space domain that includes memory, local disk storage, remote databases, and more. With enumerables, an application is written as if all the data were available in memory at one time even though the data may be physically distributed over multiple devices. In the observable model, the application is written as if the data were distributed unpredictably over time even though some or all of the data may be available in portions at particular times.

Figure 3:
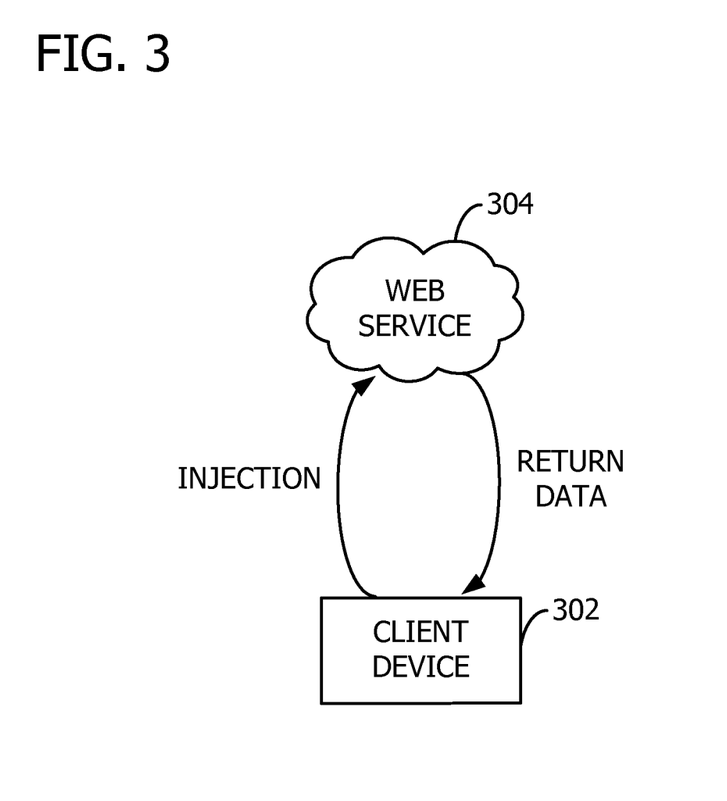
FIG. 3 is an exemplary block diagram illustrating a client device communicating with a web service to obtain data with query injection.

By being programmable, the queries in aspects of the disclosure enable application developers to use the data resources of a server or web application in unanticipated ways. For example, a server does not have to be preprogrammed with all possible queries that a client might ever want. Because some of the unanticipated ways may be malicious, aspects of the disclosure contemplate sandboxing, type-checking, timeout, restart, and other means for preventing execution of malicious functions. As such, aspects of the disclosure enable programmable web services such as web service 304. For example, the composable queries are modular and easy to build in graphical user interfaces (e.g., buttons, drop-down lists, menus, etc.). The queries are composed of a pipelined sequence of one or more operators with lambda expressions (e.g., a query pipeline or a monadic pipeline). Each stage in the pipelined sequence includes at least one operator with at least one lambda expression. Because these operators with lambda expressions are short and declarative, processing is simplified at least because operators with lambda expressions are sent, signed, logged, parsed, processed, analyzed, rewritten, compiled, sandboxed, and archived inexpensively. The queries may be processed by servers using websockets and/or event-based input-output environments.

In some embodiments, the queries are packaged into hypertext markup language (HTML) (e.g., encoded with uniform resource locators) and/or digitally signed with public key cryptography systems (PKCS) in hypertext transfer protocol (HTTP) POST bodies. The queries may also be parsed into JAVASCRIPT object notation for interoperability with programming languages such as C#.

An example of an operator with lambda expression is ".Select(x=>x<10)". The operator is ".Select" and the lambda expression is "x=>x<10". The meaning of this lambda expression is "the function of x that returns the value of the Boolean expression 'x<10'". The lambda expression is a function or other transformation from a value of one type to a value of another type. In the example in this paragraph, x is of numeric type (e.g., inferred from the presence of the less-than operator "<") and the returned value of the function is of Boolean type (e.g., either "true" or "false" as inferred from the return type of "<").

Each operator with lambda expressions has a monadic expression to the left of the dot ".". For example, if M is a monadic expression, then "M.Select(x=>x<10)" is an example operator with a lambda expression. Each operator with a lambda expression produces, in-turn, a new monadic expression. Chaining together operators with lambda expressions enables creation of monadic pipelines. For example, "M.Select(someLambda).Where(someLambda)" is a monadic expression in which:

M is one monadic expression

".Select(somelambda)" is an operator with a lambda expression,

".Where(somelambda)" is another operator with a lambda expression,

"M.Select(somelambda)" is another monadic expression, and

"M.Select(somelambda).Where(somelambda)", is yet a third monadic expression.

The queries may be composed using the set of query operators from the language integrated query (LINQ) framework, although other query-based frameworks are contemplated. Compositions or pipelines of query operators with lambda expressions may be embedded in uniform resource locators (URLs) according to the representational state transfer (REST) style.

The queries are bi-directional at least in that the queries may be injected from a client into a server or from a server into a client. The queries are also push-pull in that both push-style expressions (e.g., based on IObservable) and pull-style expressions (e.g., based on IEnumerable) may be written using many of the same LINQ operators and lambdas. In some cases, the query pipelines for an IEnumerable data collection (e.g., distributed over space) are identical in syntax to the query pipelines for an IObservable data collection (e.g., distributed over time).

In embodiments using LINQ, the queries include one or more of the query operators shown in the categories in Table 1 below. In the example operators, the argument "someLambda" represents any lambda expression (e.g., "x=>x<10", "(x, y)=>x+7*y+32–4*x*y", and the like).

TABLE 1

Example Categories and Example Operators.

| Category | Example Operator |
| --- | --- |
| Expand | SelectMany(someLambda) |
| Transform | Select(someLambda) |
| Filter | Where(someLambda) |
| Aggregate | Sum(someLambda, someLambda), Avg(someLambda, someLambda), Max(someLambda, someLambda) |
| Group | GroupBy(someLambda) |
| Order | OrderBy(someLambda) |
| Combine | Zip(otherMonad, someLambda) |
| Join | Join(otherMonad, someLambda, someLambda, someLambda) |
| Aggregate | Aggregate(seed, someLambda) |

Figure 1:
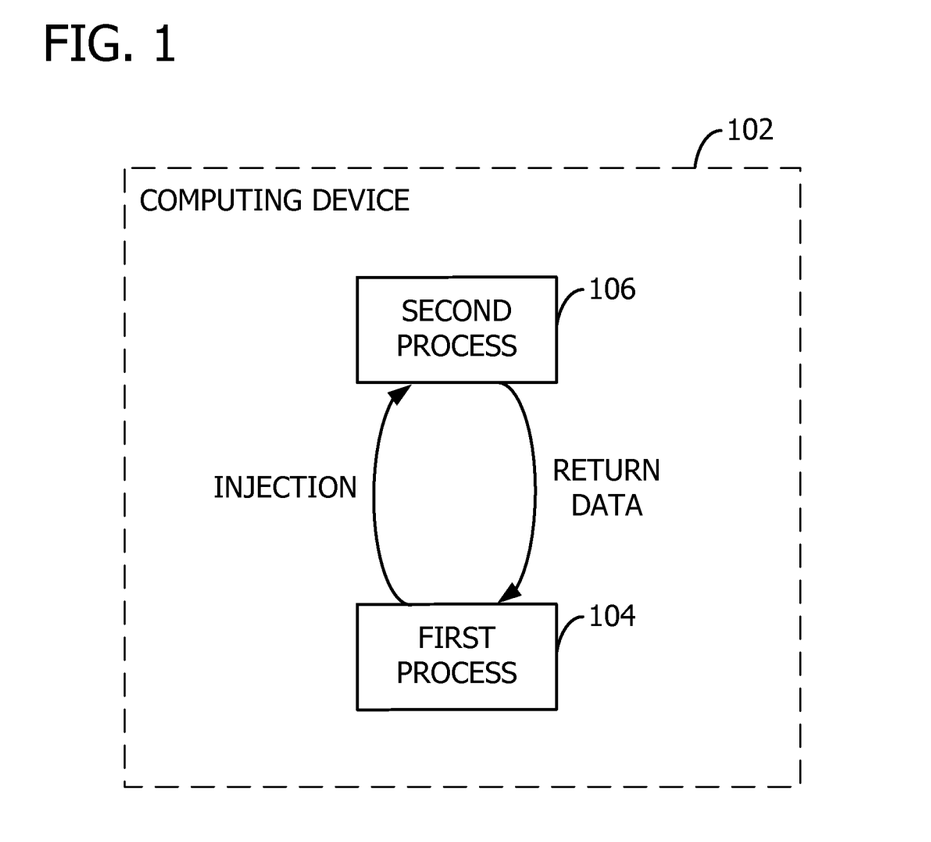
FIG. 1 is an exemplary block diagram illustrating a first process communicating with a second process to obtain data with query injection.

Referring next to FIG. 1, an exemplary block diagram illustrates a first process 104 communicating with a second process 106 to obtain data with query injection. The first process 104 and second process 106 may be executed by separate computing devices communicating via a network, For example, the first process 104 may be executed by a client device 302 and the second process 106 may be executed by a web service 304 or other cloud service (see FIG. 3). In another example, the first process 104 may be executed by the web service 304 and the second process 106 may be executed by the client device 302. In still another example, the first process 104 may be executed on a device that is a peer to a device executing the second process 106. Alternatively, the first process 104 and the second process 106 may be executed by the same computing device 102 (as shown as optional in FIG. 1). For example, the first process 104 may be associated with one thread executing on the computing device 102, and the second process 106 may be associated with another thread executing on the same computing device 102.

The first process 104 desires data from the second process 106. The requested data may be any data accessible by at least the second process 106 including, but not limited to, data generated by execution or evaluation of a query by the second process 106. The requested data may also be data generated by execution of one or more functions. In some embodiments, the request is to apply a filter to a collection of data to produce a subset of the data. For example, the first process 104 may request electronic mail messages, calendar data, product information, map data, retail store names and locations, and the like that meet one or more criteria defined in the request. The request may also include a request to subscribe to updates available from the second process 106.

In some embodiments, rather than access the requested data directly, the first process 104 prepares or produces at least one query describing the desired data. In some embodiments, the query takes the form of a sequence of operators with lambda expressions. In embodiments in which the ordering of operators is significant or intentional, the query takes the form of a sequence or other ordered collection (with duplicates allowed), instead of a set or other unordered collection (with duplicates not allowed).

The operators with lambda expressions may be ordered for execution by the first process 104, or may be capable or rearrangement by the second process 106 before execution or evaluation. While described with reference to lambda expressions or derivations thereof, aspects of the disclosure are not limited to operators with lambda expressions or to lambda expressions alone, and are operable with other query representations.

The first process 104 injects the query into a message sent from the first process 104 to the second process 106. The query may also be injected into a message sent by a process other than the first process 104. The second process 106 performs the query to produce the requested data, and then returns the requested data to the first process 104 for consumption. In this manner, the first process 104 offloads or delegates query processing to the second process 106, thereby reducing the computational burden, complexity, and memory use by the first process 104. The second process 106 may store the injected query and execute it on future data flows from the second process 106 to the first process 104. The injected query, thus, may be executed just once or may be stored as a "standing query" to be executed repeatedly until replaced or expiry after a specified time.

Figure 2:
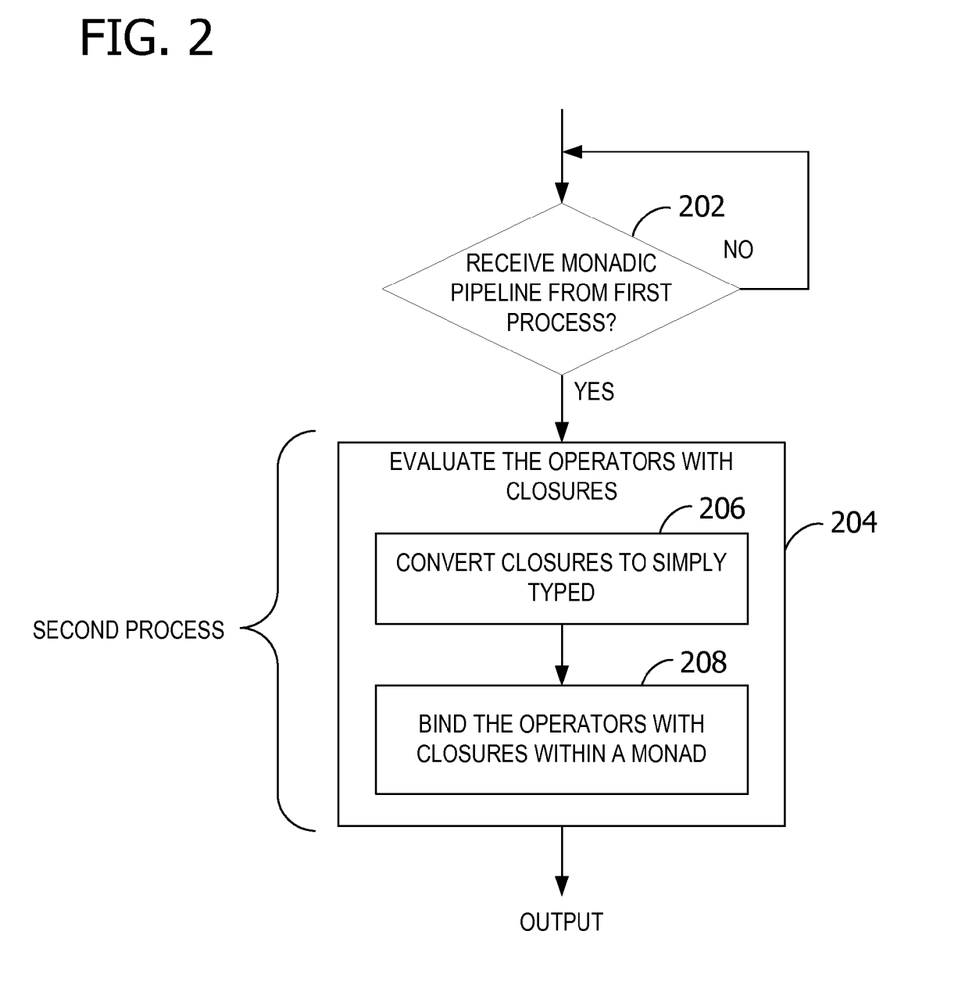
FIG. 2 is an exemplary flow chart illustrating operation of the second process to evaluate received operators with closures.

Referring next to FIG. 2, an exemplary flow chart illustrates operation of the second process 106 to evaluate received operators with closures. The second process 106 may receive, or otherwise access, one or more operators with closures produced by the first process 104. In other embodiments, a process other than the second process 106 receives the operators with closures (e.g., a process performing communications). In such embodiments, the second process 106 accesses the received operators with closures from, for example, a location in memory.

If the second process 106 receives the operators with closures at 202, the second process 106 evaluates the closures at 204. Evaluation includes, for example, evaluating and/or executing each of the operators with closures. A scheduler 504 or optimizer associated with the second process 106 determines whether the operators with closures are to be evaluated in sequence one at a time, whether the operators with closures are to be rearranged to optimize evaluation, and/or whether one or more of the operators with closures may be evaluated concurrently (e.g., if the second process 106 is multi-threaded) while other operators with closures are being evaluated.

Evaluating the received operators with closures to execute the functions or queries defined therein includes converting each of the closures to simply typed closures at 206. A simply typed calculus stands in contrast to other forms of expressions. Converting the closures to simply typed includes, but is not limited to, preventing or prohibiting self-application and/or recursive evaluation of the closures. For example, the second process 106 prevents recursive execution and self-application of the closures. In another example, the second process 106 prohibits evaluation of expressions such as (function(x){x(x);}) (function(x){x(x);}).

During evaluation, the second process 106 binds each of the converted closures within a monad to restrict execution of the functions or queries at 208. While discussed with reference to monads, aspects of the disclosure are operable with other execution proxies for detecting and preventing execution of malicious queries such as stepping (e.g., monitor memory access by each of the closures), endorsement, buddy execution, abstract execution, host timeout, authentication, and the like.

Binding the closures within the monad includes, in some embodiments, applying the same function to data output from execution of each of the functions associated with the closures. For example, the output of each evaluated operator with a closure may be placed into, or converted to, a particular data container structure. In some embodiments, evaluating the closures within the monad may be described as "sandboxing" the evaluation or the closures. As an example, binding the operators within the monad includes applying each operator, X with one or more closures, to the data produced by the operators that precede X in the query pipeline. The first item in the query pipeline is an expression of monadic type, and every subsequent operator (with closures) in the chain is type-checked to insure that all data remains in the monad. The closures attached to the operators inspect and transform the individual values inside the monad, but the closures and the operators to which the closures are attached are not permitted to "leak" those individual values outside the monad (except in cases such as with the "First" operator or the "ElementAt" operator).

Binding within the monad handles any side effects from evaluation of each of the operators with closures. In some embodiments, evaluating the operators with closures within a monad enhances security by preventing the injected queries (e.g., received from unverified sources) from accessing system resources or system calls and from requesting unresolved references. For example, monadic execution allows queries to call only functions available within a defined set of functions. Monadic execution may also prohibit one or more of the following: writing to a file system or to other memory, unbounded memory allocations, networking, display, unrestricted loading of libraries, and access to free variables outside the context of the query (e.g., those variables in the body of a function that are not in a parameter list for the function). However, in some embodiments, the second process 106 may also permit query evaluation to access one or more read-only global variables.

In some embodiments, binding the converted closures within the monad creates what is known in category theory as a Kleisli composition.

Referring next to FIG. 3, an exemplary block diagram illustrates the client device 302 communicating with the web service 304 to obtain data with query injection. The client device 302 represents any device capable of communication with the web service 304. Examples of client devices 302 are described with reference to FIG. 5 below. The client device 302 injects a query into a message sent from the client device 302 to the web service 304. The web service 304 evaluates the query and provides return data to the client device 302. In some embodiments, the client device 302 executes a browser that embeds the query into a URL 510 sent to the web service 304. The web service 304 (e.g., a website), evaluates the embedded query to generate the return data.

In some embodiments, the web service 304 represents an enumerable data producer exposing enumerators. The client device 302 represents a data consumer that calls methods on the enumerators to obtain data. Further, the web service 304 may act as an observable data producer to accept subscriptions from the client devices 302 as observers. The web service 304 calls methods in the client devices 302 to push data.

For example, the client device 302 calls a function GetEnumerator on an IEnumerable to get an Enumerator, which has the following exemplary methods:

```
public interface IEnumerator<T>
{   T Current { get; }
    bool MoveNext( );
    void Reset( );   }
```

The client device 302 pulls data from an Enumerator by calling its functions such as in the following example:

```
using(var ator = able.GetEnumerator)
    while (ator.MoveNext( ))
        Console.WriteLine(ator.Current);
```

The web service 304 exposes an IObservable with one function such as shown below:

```
public interface IObservable<out T> : IEnumerable
{   IDisposable Subscribe(IObserver<T> observer);   }
```

The client device 302 implements callbacks in the IObserver interface, and the observable of the web service 304 pushes data to the client device 302 by calling the callbacks shown below:

```
public interface IObserver<in T>
{   void OnNext(T value);
    void OnCompleted( );
    void OnError(Exception error);   }
```

An example of the web service 304 evaluating a query embedded in a URL 510 is described next with reference to FIG. 4.

Figure 4:
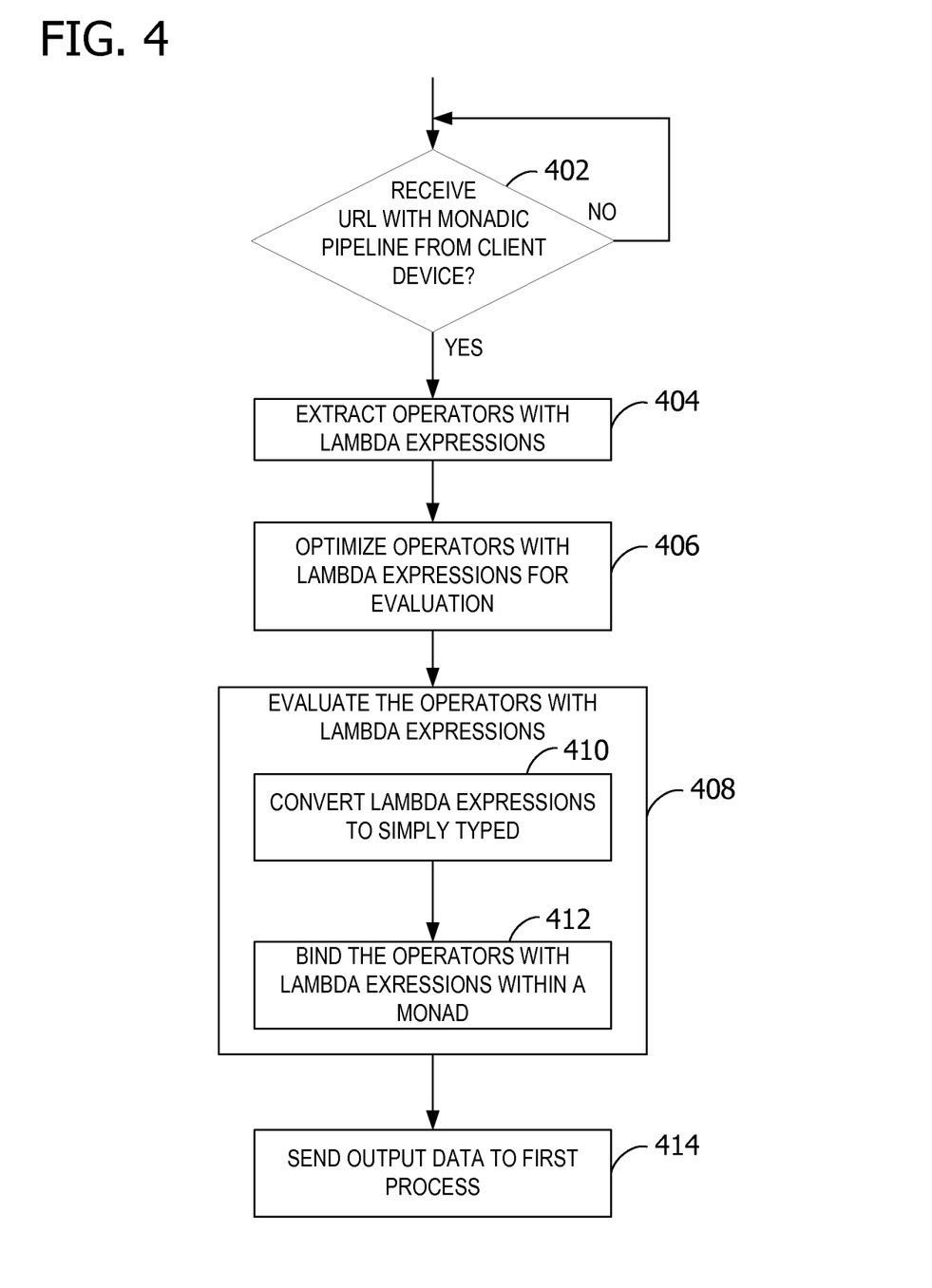
FIG. 4 is an exemplary flow chart illustrating monadic processing of queries embedded as operators with lambda expressions in uniform resource locators (URL).

Referring next to FIG. 4, an exemplary flow chart illustrates monadic processing of queries embedded as operators with lambda expressions in URLs 510. If the second process 106, or other process, receives the URL 510 from the first process 104 at 402, the operators with lambda expressions embedded in the URL 510 are extracted at 404. For example, the URL 510 is received via a network and stored in a memory area accessible to the second process 106. At 406, the extracted operators with lambda expressions may be optimized for evaluation or execution.

The operators with lambda expressions are evaluated at 408 by the second process 106 to generate the data requested by the first process 104. Evaluation includes converting the lambda expressions to simply typed lambda expressions at 410. Evaluation of each of the simply typed lambda expressions further includes binding the operators with converted lambda expressions within a monad to encapsulate data generated from each of the lambda expressions at 412. For example, binding the lambda expressions within the monad includes applying at least one operation to the data generated from each of the lambda expressions as the lambda expressions are evaluated.

The generated data is sent to the first process 104 at 414.

Figure 5:
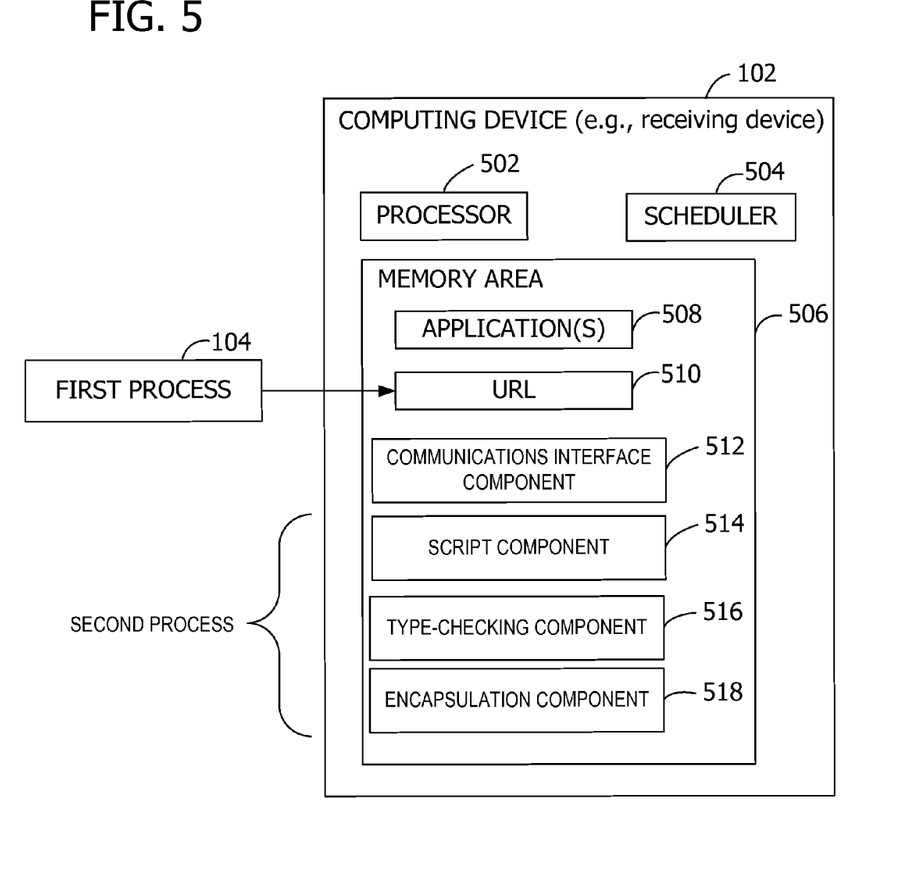
FIG. 5 is an exemplary block diagram illustrating computer-executable components on a computing device for monadic processing of injected queries.

Referring next to FIG. 5, an exemplary block diagram illustrates computer-executable components on the computing device 102 for monadic processing of injected queries. In the example of FIG. 5, the computing device 102 is associated with a user and represents a system for bi-directional, push-pull, dynamically programmable injection of operations into communications between the first process 104 and the second process 106. In some embodiments, the computing device 102 corresponds to the second process 106 or the device for processing the lambda expressions.

The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 504, the scheduler 504, and a memory area. The processor 504 includes any quantity of processing units, and is programmed to execute computer-executable instructions for implementing aspects of the disclosure. The instructions may be performed by the processor 504 or by multiple processors executing within the computing device 102, or performed by a processor external to the computing device 102. In some embodiments, the processor 504 is programmed to execute instructions such as those illustrated in the figures (e.g., FIG. 2 and FIG. 4). Alternatively or in addition, aspects of the disclosure contemplate an execution engine capable of executing the operators with the lambda expressions in customized hardware or microcode.

The scheduler 504 includes any process for analyzing the operators with lambda expressions and determining the order and timing of evaluation of each. The scheduler 504 executes to optimize evaluation of the lambda expressions.

The computing device 102 further has one or more computer readable media such as the memory area. The memory area includes any quantity of media associated with or accessible by the computing device 102. The memory area may be internal to the computing device 102 (as shown in FIG. 5), external to the computing device 102 (not shown), or both (not shown).

The memory area stores, among other data, one or more applications 508. The applications 508, when executed by the processor 504, operate to perform functionality on the computing device 102. Exemplary applications 508 include mail application programs, web browsers, calendar application programs, address book application programs, messaging programs, media applications, location-based services, search programs, recommender services, and the like. The applications 508 may communicate with counterpart applications or services such as the web service 304 via a network. For example, the applications 508 may represent downloaded client-side applications that correspond to server-side services executing in a cloud.

An example structure of the application 508 designed to implement aspects of the disclosure is next described. The exemplary application 508 is implemented in a middle-tier server with websockets using a framework such as the .NET framework. While websockets preserve the option to provide unsolicited updates from the web service 304 to the client device 302, aspects of the disclosure are also operable with other transport mechanisms such as the hypertext transfer protocol (HTTP). An OnNext method of the client device 302 is added as a listener to a websocket. The OnNext method analyzes and applies a query from the client device 302, and then provides output data from application of the query, to the client device 302.

In embodiments in which the operators with lambda expressions are embedded in a URL such as URL 510, the memory area further stores the URL 510. In embodiments in which the operators with lambda expressions are included via public key cryptography standards (PKCS) or included in a script such as in the JAVASCRIPT scripting language, the memory area stores the PKCS package or JAVASCRIPT object notation. In some embodiments, PKCS provides source authentication (e.g., who sent the queries), tamper-proofing (e.g., no middle-party has modified the queries), non-repudiation (e.g., the original sender may not claim that it did not send the query), and/or privacy (e.g., only the intended recipient can decrypt the queries).

The memory area further stores one or more computer-executable components. Exemplary components include a communications interface component 512, a script component 514, a type-checking component 516, and an encapsulation component 518. Execution of these components performs operations such as those illustrated in FIG. 2. In the example shown in FIG. 5, the script component 514, type-checking component 516, and encapsulation component 518 represent the second process 106. In other examples (not shown), the second process 106 further provides the functionality associated with the communications interface component 512.

The communications interface component 512, when executed by the processor 504, causes the processor 504 to receive, from the first process 104, a communication having a sequence of operators with lambda expressions injected therein. The operators with lambda expressions represent one or more functions to be performed by the second process 106 to generate output data. In some embodiments, the communications interface component 512 includes a network interface card and/or computer-executable instructions (e.g., a driver) for operating the network interface card.

The script component 514, when executed by the processor 504, causes the processor 504 to statically analyze, by the second process 106, the operators with lambda expressions, to convert the lambdas into simply-typed form, to reorder the sequence of operators with lambda expressions for optimization or for any other reason, and to execute the functions to generate the output data. For example, the script component 514 executes the functions over a monadic data collection representing one or more of the following: an enumerable data collection, a collection of data items distributed over space, and an observable stream representing a collection of data distributed over time. In this example, the operators with lambda expressions represent a pipelined sequence of expressions. Some embodiments of the script component 514 contemplate inclusion of the type-checking component 516 and the encapsulation component 518. In other embodiments, the type-checking component 516 and the encapsulation component 518 are separate from, yet in communication with, the script component 514.

The type-checking component 516, when executed by the processor 504, causes the processor 504 to convert each of the lambda expressions to simply typed lambda expressions. The encapsulation component 518, when executed by the processor 504 during run-time, causes the processor 504 to apply the operators with lambda expressions converted during the static analysis within a monad to the results of each prior stage of the reordered pipeline of operators with lambda expressions to contain the execution of the functions. For example, the encapsulation component 518 creates a container data structure for encapsulating the data output from evaluation of each of the operators with lambda expressions. Creating the container data structure may include applying at least one operation to each of the operators with converted lambda expressions as the operators with lambda expressions are evaluated. The same operation or set of operations is applied to the output of each stage in the pipeline of the evaluated operators with lambda expressions.

In some embodiments, an encapsulation-checking component (not shown) performs static checks to confirm that each stage of a monadic pipeline maintains monadic integrity by having an appropriate monadic type. This provides some assurance that the encapsulation component 518 does not violate monadic integrity during run-time.

After evaluation of the operators with lambda expressions by the script component 514, the communications interface component 512 provides the generated output data to the first process 104.

Additional Examples

Listed below is an example of a monadically sandboxed function that displays the string "Hello World" using lambda expressions.

```
"Hello"
    .Return( ) // Lifts hello into the sandbox (the IO<string> monad)
    .SelectMany(str => str.ToUpper( ).Return( )) // transforms the string
and lifts result into the monad
    .SelectMany(str => (str + ", World!").Return( )) // can never get out
of the monad
    .SelectMany(str => {Console.WriteLine(str); return Unit( );}) // Now
in the IO<unit> monad
```

This produces "HELLO, World!" The types within the brackets change, but stay within the monad. In this example, the Select method is not allowed in this model. The SelectMany method "flattens" out exactly one level of monadic nesting in each call, so that sandbox(sandbox(x)) becomes sandbox(x) before going on to the next lambda expression in the pipeline.

In some embodiments, a query embedded by the first process 104 may correspond to a filter for examining items in a data collection to produce a potentially smaller data collection. For example, in a database of various phonetic alphabets for verbal spelling over noisy phone and radio channels (e.g., "alpha," "bravo," "charlie," "delta," etc.), the first process 104 may interested only in the phonetic alphabets adopted by the International Civil Aviation Organization (ICAO). An exemplary query composed of lambda expressions using LINQ operators is shown below:

```
phoneticAlphabets
    .Where(function(w){return w.Origination == Origination.ICAO;})
    .OrderBy(function(w){return w.CodeWord;})
```

In this example, the first process 104 sends this query to the second process 106 encoded in a URL as shown below:

```
http://.../phoneticAlphabets.Where(function(w)%7breturn+w.Origination%3d
%3dOrigination.ICAO%3b%7d).OrderBy(function(w)%7breturn+w.CodeWord%3b
%7d)
```

The second process 106 associates the query with the authenticated user channel, if available; otherwise, the query is communicated via a PKCS envelope (e.g., in the body of an HTTP POST verb, rather than by embedding the query in the URL as in a REST-ful embedding. In the case of a PKCS envelope, the second process 106 checks the signature on the PKCS envelope for the purposes of sender authentication, tamper-proofing, and non-repudiation. The second process 106 then logs, interprets, compiles, and evaluates the query in a monad, returning the results to the first process 104.

In another example, the user is interested in codewords in the phonetic alphabets that contain the letter 'r'. An exemplary query composed of lambda expressions using LINQ operators is shown below:

```
phoneticAlphabets
    .Where(function(w){return w.CodeWord.ToCharArray(
       ).Contains('r');})
    .Select(function(w){return w.CodeWord;})
    .Distinct( )
```

The first process 104 encodes this query into a URL as shown below for transmission to the second process 106.

```
http://phonetic.alphabets.com/RESTLINQ/phoneticAlphabets.Where(function
(w)%7breturn+w.CodeWord.ToEnumerable( ).Contains('r')%3b%7d).Select(function(
w)%7breturn+w.CodeWord%3b%7d).Distinct( )
```

In a bi-directional example, the second process 106 subscribes to a periodic stream of location updates or occasional interest updates from the first process 104. Similarly, the first process 104 subscribes to sporadic offers from businesses in the geographic vicinity of the client device 302 that match particular interests. Exemplary code on the second process 106 is shown below.

```
clientObservable // proxy to the observable on the client side
    .Subscribe(client => RelevantBusinesses = AllBusinesses
    .Within(client.Vicinity)
    .Where(business => business.IsRelevant(client))
```

The argument of the Subscribe method is an observer function written as a lambda expression. This use of lambda expressions is distinct from their use inside query operators. In this example, the lambda expressions respond to events from the first process 104. In the context of query operators, the lambda expressions are applied to data elements within a monad (e.g., an enumerable monad and/or an observable monad). The function parameters appear to the left of => arrows and function bodies appears to the right. The notation x=> . . . represents function(x){return . . . ;}. The Subscribe method ensures that the observer function is called every time an update from the first process 104 arrives at the second process 106. The observer function fetches a collection of observable businesses, filtered within the current vicinity of, and relevance to, the first process 104. The observable collection is assigned to the property Relevant-Businesses.

The first process 104 subscribes to the property Relevant-Business as shown below.

```
server.RelevantBusinesses // proxy to the server's observable
    .SelectMany(business => business.Offers
    .Where(offer => this.Interests.Match(offer))
    .Merge( )
    .Subscribe(offer => this.RespondToOffer(offer))
```

This query, written in the form of "operators with lambda expressions," merges the offers from the businesses via the SelectMany method, filters merged offers by more private matching interests, then subscribes an offer-observer function that decides how to respond to each offer as it arrives. This example illustrates that, in some embodiments, some of the queries may be kept on the first process 104 side for privacy reasons.

In some embodiments, queries may be dynamically programmable (e.g., the queries from one process may be altered by the other process). In an example, the second process 106 injects a "slow-down" (e.g., flow control) into the first process 104 in the form of an instruction to "send only every n-th observation." The following query, written in the form of operators with lambda expressions, illustrates the query from the first process 104 injected with another lambda expression by the second process 106. The injected operator with lambda expression is .Where(tick=>(tick %2==0)).

```
clientObservable // proxy to the observable on the client side
    .Where(tick => (tick % 2 == 0) // only every other one, please!
    .Subscribe(client => RelevantBusinesses = AllBusinesses
        .Within(client.Vicinity)
        .Where(business => business.IsRelevant(client))
```

The above query may be rewritten in another form, as shown below, to emphasize the structure of the query processor as an evaluator for a domain specific language (DSL) (e.g., with LINQ as the instruction set), optionally implemented with hardware enhancements and optimizations.

```
clientObservable // proxy to the observable on the client side
    .LinqEval(LinqInstruction.Where, "tick => (tick % 2 == 0)")
        .Subscribe(client => RelevantBusinesses = AllBusinesses
            .Within(client.Vicinity)
            .Where(business => business.IsRelevant(client))
```

In another example, the client device 302 is a mobile device that wants to discover nearby pizza restaurants. The following query is composed by the client device 302:

```
.Where('b => b.Category!==undefined')
.Where('b => /pizza/i.test(b.Category)')
```

The query may be packaged as text in an HTTP POST, potentially protected in PKCS envelopes, or alternatively embedded within a URL as shown below.

```
http://.../?standingQuery=.Where(function(b)%7Breturn%20b.Category!%3D
%3Dundefined%3B%7D)%0B.Where(function(b)%7Breturn%20%2Fpizza%2Fi.test(
b.Category)%3B%7D)
```

At least a portion of the functionality of the various elements in FIG. 1, FIG. 3, and FIG. 5 may be performed by other elements in FIG. 1, FIG. 3, and/or FIG. 5, or an entity (e.g., processor, web service, server, application program, computing device, etc.) not shown in FIG. 1, FIG. 3, and/or FIG. 5.

In some embodiments, the operations illustrated in FIG. 2 and FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for processing query operators embedded in a scripting language in URLs 510 using monads, and exemplary means for monadic evaluation of the operators with lambda expressions by web services such as web service 304.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for injection of operations into communications between a first process and a second process, the system comprising a hardware processor programmed to:
   extract one or more operators with closures from a uniform resource locator (URL) that is received from the first process, the one or more operators with closures corresponding to at least one request for data; and
   evaluate, by the second process, the one or more operators with closures to generate the data requested by the one or more operators with closures, each evaluation comprising:
      converting the closures to simply-typed closures to yield one or more operators with converted closures; and
      binding the one or more operators with converted closures within a monad to encapsulate the data.

2. The system of claim 1, wherein the first process is executed by a client device and the second process is executed by a cloud service.

3. The system of claim 1, wherein the first process is executed by a cloud service and the second process is executed by a client device.

4. The system of claim 1, wherein the hardware processor is programmed to bind the one or more operators with converted closures within the monad by applying at least one operation to the data, wherein the operation is applied to data generated from a prior operator with converted closures in a pipeline.

5. The system of claim 1, further comprising means for processing query operators embedded in a scripting language.

6. The system of claim 1, further comprising means for monadic evaluation of operators with closures by web services.

7. A method comprising:
   extracting one or more operators with closures from a uniform resource locator (URL) that is received from the first process, the one or more operators with closures corresponding to at least one request for data; and evaluating, by the second process, the one or more operators with closures to generate the data requested by the one or more operators with closures, the evaluating including
    converting the closures to simply-typed closures to yield one or more operators with converted closures, and
    binding the one or more operators with converted closures within a monad to restrict execution of the one or more functions.

8. The method of claim 7, wherein the binding the one or more operators with converted closures within the monad comprises creating a Kleisli composition.

9. The method of claim 7, wherein the evaluating the one or more operators with closures comprises ordering the one or more operators with closures for sequential evaluation.

10. The method of claim 7, wherein the converting the closures comprises one or more of the following: prohibiting recursive evaluation of the closures, and prohibiting self-application of higher-order arguments to the closures.

11. The method of claim 7, wherein the binding the one or more operators with converted closures within the monad comprises applying at least one operation to output data from execution of the one or more functions.

12. The method of claim 7, wherein the method is bi-directional and dynamically programmable.

13. The method of claim 7, wherein evaluating the one or more operators with closures comprises applying a filter to a collection of data to produce a subset of the data.

14. The method of claim 7, wherein a computing device executes the first process and the second process.

15. The method of claim 7, wherein evaluating the one or more operators with closures comprises evaluating query operators selected from a set consisting of: expand, transform, filter, group, join, order, combine, and aggregate.

16. A method, comprising:
causing at least one processor to receive, from a first process, a communication having a sequence of operators with closures injected therein, the sequence of operators with closures representing functions to be performed by a second process to generate output data; and
causing at least one processor to statically analyze, by the second process, the sequence of operators with closures to execute the functions to generate the output data, the script component comprising:
    causing at least one processor to convert the closures to simply typed closures to yield one or more operators with converted closures; and
    causing at least one processor to apply, within a monad, the one or more operators with converted closures to output data from a prior stage in the sequence to contain execution of the functions,
wherein the communications interface component provides the output data to the first process.

17. The method of claim 16, wherein, in the causing at least one processor to apply the one or more operators with converted closures, at least one operation is applied to a preceding monadic expression.

18. The method of claim 16, wherein, in the causing at least one processor to convert the closures to simply typed closures, recursive execution and self-application of the closures are prevented.

19. The method of claim 16, wherein, in the causing at least one processor to statically analyze the sequence of operators with closures, the functions are executed over a monadic data collection representing one or more of the following: an enumerable data collection; a collection of data items distributed over space; and an observable stream representing a collection of data distributed over time.

* * * * *